Dec. 13, 1966  G. B. METCALF  3,291,114
CHARCOAL BARBECUE UNIT
Filed Oct. 15, 1964  2 Sheets-Sheet 1
FIG. 1
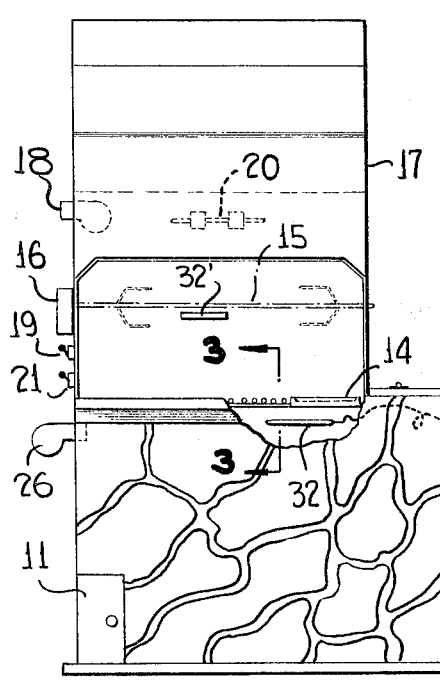
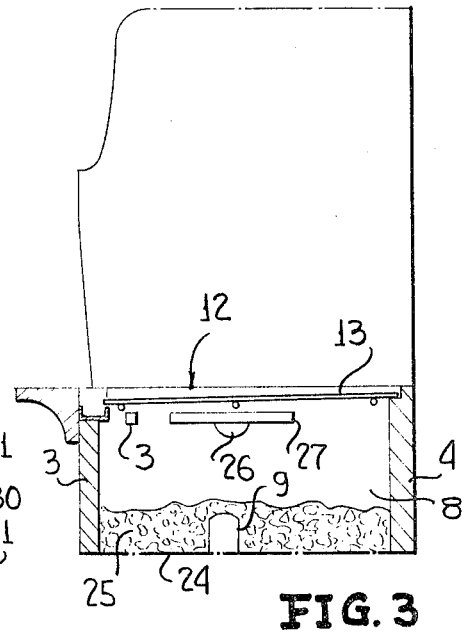
FIG. 3
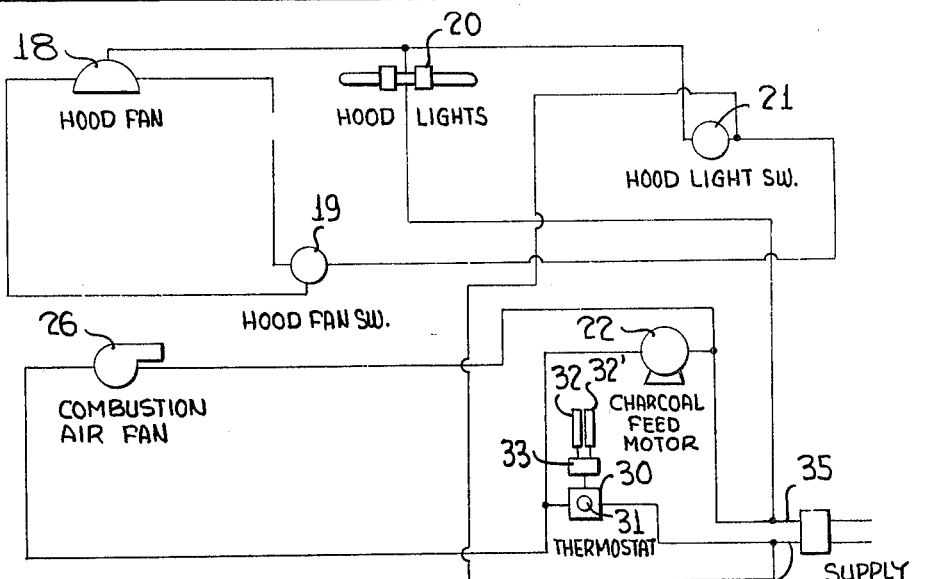
FIG. 4
INVENTOR
GERALD B. METCALF
BY *Hurvitz & Rose*
ATTORNEYS

INVENTOR
GERALD B. METCALF

BY Hurvitz & Rose

ATTORNEYS 3,291,114
CHARCOAL BARBECUE UNIT
Gerald B. Metcalf, 2 Grant Place, Mount Vernon, Ill.
Filed Oct. 15, 1964, Ser. No. 404,075
5 Claims. (Cl. 126—25)

The present invention relates to a charcoal barbecue unit, and more specifically to a barbecue unit having means to control cooking temperature.

Existing barbecue units of the charcoal burning variety have many disadvantages not encountered in electric or gas burning units. For instance in conventional charcoal burning units maintenance of constant desired grille or rotisserie temperature cannot be done, thereby resulting in foods cooked at too high or too low a temperature. Further, with charcoal units now in use, additional fuel must be added manually from time to time resulting usually in wasteful fuel consumption. Other disadvantages of present charcoal units are that small ash particles become suspended in combustion gases and deposit on the food being cooked, the chef, and generally in the area surrounding the unit.

A primary objective of the present invention is to provide a charcoal barbecue unit with means to maintain constant predetermined desired temperature in the area of the food being cooked.

A further object of the present invention is to provide a charcoal barbecue unit with means adapted to automatically control the feed of charcoal and the introduction of combusion air to a firebox in such a manner as to maintain a constant predetermined temperature in the area of the food being cooked.

Another object of the present invention is to provide a charcal barbecue unit with a conveyor adapted to feed charcoal upwardly through the bottom of a firebox so as to minimize the amount of smoke and ash particles given off by the burning charcoal within the firebox.

An additional object of the present invention is to provide a charcoal barbecue unit having means to control the flow of combustion air into the firebox in such a manner that ash particles suspended by the combustion gases do not contact the food being cooked.

Other objects and the advantages of the present invention will be apparent from the following detailed description of a preferred embodiment of the present invention.

In the drawing:

FIGURE 1 is a view in front elevation showing the charcoal barbecue unit with parts broken away to illustrate better the internal construction;

FIGURE 3 is a partial section view taken generally along the line 3—3 of FIGURE 1; and FIGURE 4 is a block diagram of the electrical circuits.

Figure 2:
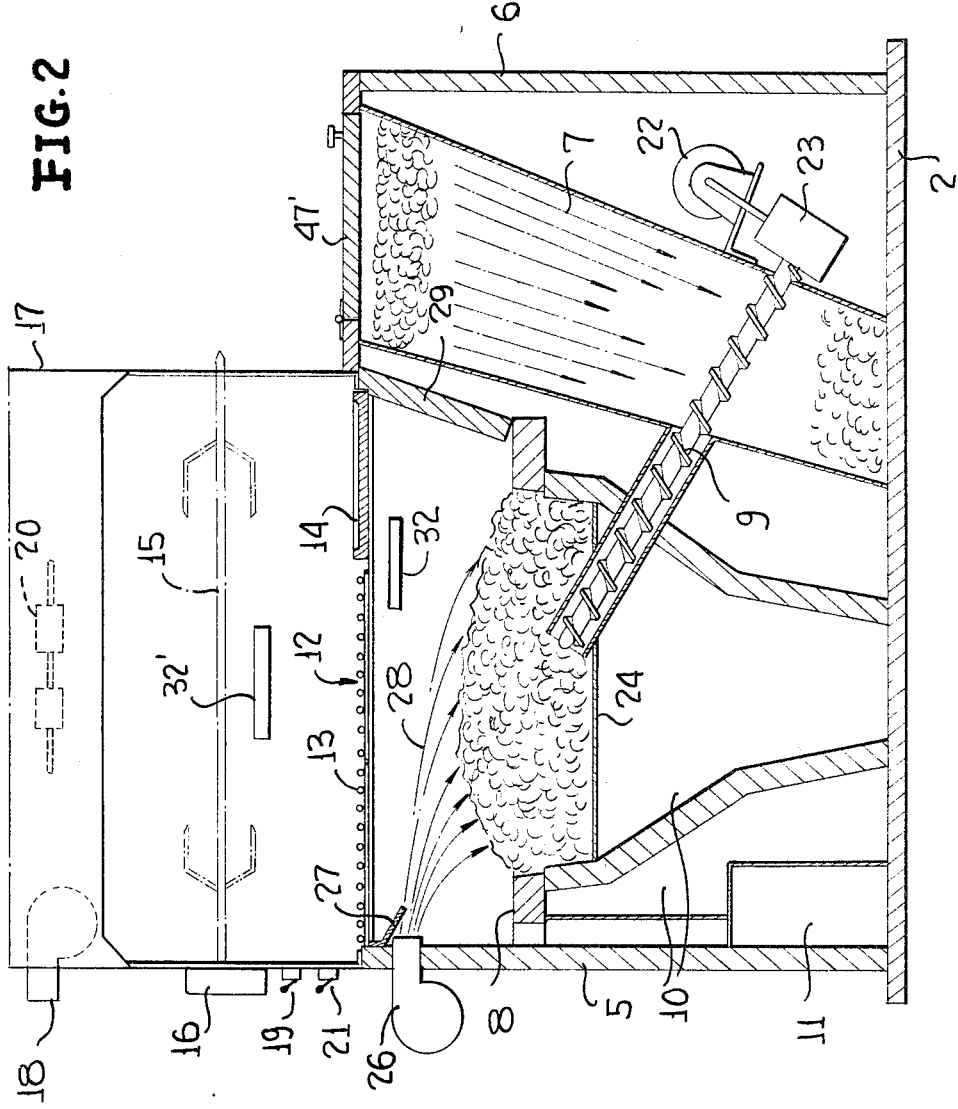
FIGURE 2 is a view similar to FIGURE 1 but showing the front wall of the unit casing removed.

Referring to the drawing, it may be seen that the barbecut unit 1 of the present invention has a generally rectangular casing which may be permanently mounted on a base surface 2. The casing includes fire resistant front and rear walls 3, 4 and end walls 5, 6 adapted to enclose a charcoal supply hopper 7, a firebox 8, and a charcoal feed screw conveyor 9. If desired a suitable insulating material 10 may be provided to shield walls 3, 4, 5, 6 of the casing, conveyor 9, and the supply hopper 7 from the heat of firebox 8. A suitable container 11 to facilitate ash removal from the firebox may be built into the back or side wall.

A food support 12, which may include an open grille 13 and a flat griddle 14, is disposed directly above firebox 8 being supported at the marginal edges thereof by any suitable support means (not shown). Alternatively, food to be barbecued may be mounted on rotisserie unit 15 which is rotated by a geared down electric motor 16. Suitably rotisserie 15 is secured to the walls of the exhaust hood 17. Cooking fumes are taken off through exhaust hood 17 with the aid of exhaust fan 18 (controlled by switch 19); and illumination may be provided by light 20 (controlled by switch 21) mounted in hood 17.

As shown in FIGURE 2, fresh charcoal is fed into firebox 8 by screw conveyor 9 which is powered by a constant speed electric motor 22 acting through transmission 23. This conveyor 9 is arranged to feed charcoal from the bottom of supply hopper 7 upwardly through the bottom wall 24 of firebox 8. The bottom feed of charcoal acts so as to minimize the amount of smoke and ash particles given off by the burning charcoal 25 when additional charcoal is added. Preferably, conveyor 9 is inclined at an angle of between 30 and 45 degrees to allow for a relatively large charcoal storage space in hopper 7 directly alongside firebox 8 thereby minimizing the overall length of unit 1. Also, tilting of the conveyor acts as a safety measure to retard back burning along the conveyor into the fuel supply.

As best seen in FIGURES 2 and 3 a constant speed electric fan 26 is positioned in end wall 5 at a point below grille 13. The fan 26 supplies combustion air to the bed 25 of burning charcoal. A baffle plate 27 deflects the air stream generally towards the burning charcoal 25, the air stream 28 being indicated by arrows. As a result any particles of ash picked up by air stream 28 are conveyed across firebox 8 to be impinged upon side wall 29 or the under side of imperforate griddle 14. In this manner ash particles are largely prevented from passing upwardly through the open grille 13 into contact with food being barbecued thereon or on rotisserie 15. Combustion gases and excess air diffuse out from under griddle 14 and up through grill 12 to exhaust hood 17.

As shown in FIGURE 1, access to the grille 13, griddle 14 and rotisserie 15 is through the front opening in exhaust hood 17. Charcoal hopper 7 is normally closed off by a removable door 47.

A principal feature of the barbecue unit of the present invention is the integration of a temperature control means in the unit, diagrammatically illustrated in FIGURE 4 to maintain a constant predetermined temperature in the cooking region. The temperature control means includes a conventional adjustable thermostat 30 which may be set by manually operated dial 31 (FIGURE 1) to be responsive to a predetermined temperature. The temperature sensing means, such as a thermostat bulb 32, is mounted in any suitable manner adjacent to the food supporting grille and griddle 13, 14. If the unit will be employed principally to barbecue food on rotisserie 15, the bulb 32 may be moved to point 32'. Alternatively, separate bulbs 32 and 32' may be provided and selectively connected by a suitable switch 33 to thermostat control 30.

It will be obvious to one skilled in the art that the practice of this invention may employ any of several types of temperature sensing elements and selectively adjusted temperature control thermostats, all of which are well known in the art.

For the purpose of explaining the operation of the present invention, it will be assumed that a user of the unit wishes to maintain temperature in the area of open grille 13 at a predetermined desired value. By rotating dial 31 to the desired value, the thermostat 30 is set. Thereafter the temperature in the area of the grille 13 sensed by bulb 32 is compared with the setting of switch 30. If the sensed temperature is below the set temperature, switch 30 acts to complete the circuit between power lines 34, 35 through motor 22 and fan 26, whereby charcoal and combustion are supplied to the firebox. When the temperature sensed by bulb 32 reaches the preset value, thermostat 30 breaks the circuit through motor 22 and fan 26 and the motor and fan thereafter remain deenergized until the sensed temperature falls below the preset value. If desired, the fan may be operated continuously or a two-speed fan may be employed.

While the preferred embodiment of the barbecue unit has been described, it will be apparent to those skilled in the art that numerous variations are possible. Thus the thermostat control can be adapted to provide a low level constant feed rate for charcoal and combustion air and vary the rate of feed in accordance with the sensed temperature, or to vary the supply of charcoal while maintaining the supply of combustion air constant.

Further it will be apparent to those skilled in the art that the barbecue unit of the present invention need not be a stationary installation, but may be provided with wheels or the like to permit it to be moved from room to room or from indoors to outdors.

Still other modifications and embodiments of the present invention will be apparent to those skilled in the art without departing from the inventive scope of the hereinafter appended claims.

What is claimed is:

1. A charcoal barbecue unit comprising in combination: an upwardly opening firebox; open grille food supporting means disposed above said firebox so that food support thereon is in contact with combustion products; a charcoal storage hopper; a conveyor adapted to feed charcoal from said hopper to said firebox; power means for operating said conveyor; a temperature sensing element in the region of said food supporting means; and a thermostat actuated by said sensing element to control operation of said power means, whereby said power means is energized and deenergized by temperature variations in the region of the food supporting means to regulate feed of charcoal to the firebox to maintain a predetermined temperature in the region of said food supporting means.

2. The barbecue unit of claim 1 having also fan means for introducing air into said firebox over the charcoal, said fan means being controlled by said thermostat whereby said fan means also is energized and deenergized by temperature variations in the region of the food supporting means.

3. A charcoal barbecue unit comprising in combination: an upwardly opening firebox; open grille food supporting means disposed above said firebox so that food supported thereon is in contact with combustion products; a charcoal storage hopper; an inclined screw conveyor adapted to feed charcoal from the bottom of said hopper upwardly through the bottom of said firebox; power means for operating said conveyor; a temperature sensing element responsive to the temperature in the region of said food supporting means; and a thermostat actuated by said sensing element and adapted to control operation of said power means, whereby said power means is energized and deenergized by temperature variations in the region of the food supporting means to regulate feed of charcoal to the firebox to maintain a predetermined temperature in the region of said food supporting means.

4. The barbecue unit of claim 3 having fan means for forcing air into the firebox over the charcoal disposed within said firebox, said fan means being controlled by said switch means, whereby said fan means also is energized and deenergized by temperature variations in the region of the food supporting means.

5. A charcoal barbecue unit comprising in combination: a casing; an upwardly opening firebox disposed adjacent one end of said casing; a charcoal supply hopper disposed adjacent the other end of said casing; an upwardly inclined screw conveyor adapted to feed charcoal from the bottom of said hopper upwardly to the bottom of said fireboxx; power means for operating said conveyor; a horizontally disposed food supporting means disposed immediately above said firebox, said supporting means including an open grille disposed adjacent one end of said firebox so that food supported thereon is in contact with combustion products and a griddle disposed adjacent the other end thereof; fan means for introducing air into said firebox at a point below said grille; means disposed within said firebox for deflecting air flowing from said fan towards engagement with charcoal contained therein, whereby particles of charcoal picked up by said flow are prevented from passing upwardly through said grille; and temperature control means including a temperature sensing element responsive to temperature in the grille and griddle region for controlling said power means and said fan means, so as to maintain a predetermined temperature in the griddle and grille region.

References Cited by the Examiner

UNITED STATES PATENTS

| | | |
|---|---|---|
| 1,632,176 | 6/1927 | Crain. |
| 2,141,831 | 12/1938 | Stockstrom et al. |
| 2,608,190 | 8/1952 | Winning et al. |
| 2,833,201 | 5/1958 | Simank. |
| 2,867,208 | 1/1959 | True et al. _____ 126—25 X |

FREDERICK KETTERER, *Primary Examiner.*